United States Patent
Li

(10) Patent No.: US 6,856,727 B2
(45) Date of Patent: Feb. 15, 2005

(54) COUPLING OF LIGHT FROM A NON-CIRCULAR LIGHT SOURCE

(75) Inventor: Kenneth K. Li, Arcadia, CA (US)

(73) Assignee: Wavien, Inc., Santa Clarita, CA (US)

( * ) Notice: Subject to any disclaimer, the term of this patent is extended or adjusted under 35 U.S.C. 154(b) by 330 days.

(21) Appl. No.: 10/086,642

(22) Filed: Mar. 4, 2002

(65) Prior Publication Data

US 2002/0122621 A1 Sep. 5, 2002

Related U.S. Application Data

(60) Provisional application No. 60/272,304, filed on Mar. 2, 2001, and provisional application No. 60/294,590, filed on Jun. 1, 2001.

(51) Int. Cl.⁷ ................................................. G02B 6/26
(52) U.S. Cl. ............................. 385/31; 385/15; 385/33; 362/32; 362/241
(58) Field of Search ............................. 385/31–33, 15, 385/43, 100, 146; 362/32, 241, 297, 551, 560; 359/852

(56) References Cited

U.S. PATENT DOCUMENTS

| | | | |
|---|---|---|---|
| 1,163,192 A | | 12/1915 | Adams |
| 2,891,437 A | | 6/1959 | Tripp |
| 3,874,783 A | | 4/1975 | Cole |
| 3,923,381 A | * | 12/1975 | Winston ............... 359/852 |
| 3,986,767 A | | 10/1976 | Rexer et al. |
| 4,076,378 A | | 2/1978 | Cole |
| 4,240,692 A | * | 12/1980 | Winston ............... 385/146 |
| 4,441,783 A | * | 4/1984 | Houghton et al. .......... 385/146 |
| 4,458,302 A | | 7/1984 | Shiba et al. |
| 4,473,295 A | | 9/1984 | Doyle |
| 4,483,585 A | | 11/1984 | Takami |
| 4,576,435 A | | 3/1986 | Nishioka |
| 4,735,495 A | | 4/1988 | Henkes |
| 4,747,030 A | | 5/1988 | Offner et al. |
| 4,747,660 A | | 5/1988 | Nishioka et al. |
| 4,755,918 A | | 7/1988 | Pristash et al. |
| 4,757,431 A | | 7/1988 | Cross et al. |
| 4,915,479 A | * | 4/1990 | Clarke ..................... 349/62 |
| 5,130,913 A | | 7/1992 | David |
| 5,146,248 A | * | 9/1992 | Duwaer et al. ............. 353/122 |
| 5,191,393 A | | 3/1993 | Hignette et al. |

(List continued on next page.)

FOREIGN PATENT DOCUMENTS

| | | | | |
|---|---|---|---|---|
| JP | 01049017 A | * | 2/1989 | ........... G02B/27/18 |
| JP | 10-178 | | 6/1998 | |

*Primary Examiner*—Gregory J. Toatley, Jr.
*Assistant Examiner*—Sang H. Nguyen
(74) *Attorney, Agent, or Firm*—Rothwell, Figg, Ernst & Manbeck, PC

(57) ABSTRACT

A numerical aperture (NA) equalizing apparatus including a transmission element with an input surface, in which the input surface has a first input dimension and a second input dimension, with the second input dimension being substantially orthogonal to the first input dimension, and the first input dimension is substantially unequal to the second input dimension. Such an NA equalizing system may further include a reflector having a first and a second focal points, with a source of electromagnetic radiation located proximate to the first focal point to produce rays of radiation that are reflected by the reflector and converge substantially at the second focal point. A transmission element to be illuminated with at least a portion of the electromagnetic radiation emitted by the source is placed so that an input surface is located proximate to the second focal point to collect the electromagnetic radiation. The input surface has a first input dimension and a second input dimension, with the second input dimension being substantially orthogonal to the first input dimension, and the first input dimension is substantially unequal to the second input dimension.

37 Claims, 22 Drawing Sheets

U.S. PATENT DOCUMENTS

| | | | |
|---|---|---|---|
| 5,317,484 A | 5/1994 | Davenport et al. | |
| 5,414,600 A | 5/1995 | Strobl et al. | |
| 5,430,634 A | 7/1995 | Baker et al. | |
| 5,528,714 A * | 6/1996 | Kingstone et al. | 385/100 |
| 5,541,746 A | 7/1996 | Hamagishi et al. | |
| 5,625,738 A | 4/1997 | Magarill | |
| 5,748,376 A | 5/1998 | Lin et al. | |
| 5,751,480 A | 5/1998 | Kitagishi | |
| 5,754,719 A | 5/1998 | Chen et al. | |
| 5,764,845 A * | 6/1998 | Nagatani et al. | 385/146 |
| 5,772,313 A | 6/1998 | Taylor | |
| 5,884,991 A | 3/1999 | Levis et al. | |
| 5,890,795 A | 4/1999 | Taylor | |
| 6,053,615 A | 4/2000 | Peterson et al. | |
| 6,139,157 A | 10/2000 | Okuyuma | |
| 6,227,682 B1 | 5/2001 | Li | |
| 6,385,371 B1 * | 5/2002 | Li | 385/43 |
| 6,565,235 B2 | 5/2003 | Li | |
| 6,587,269 B2 | 7/2003 | Li | |
| 6,595,673 B1 * | 7/2003 | Ferrante et al. | 362/551 |
| 6,634,759 B1 | 10/2003 | Li | |
| 6,672,740 B1 | 1/2004 | Li | |

* cited by examiner

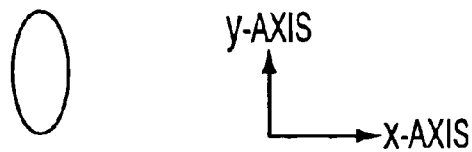
FIG. 8(a)   Related Art
FIG. 8(b)   Related Art
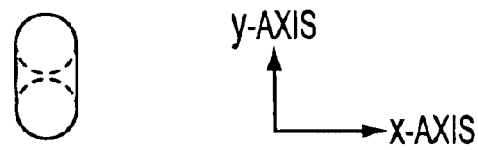
FIG. 8(c)   Related Art
FIG. 8(d)   Related Art
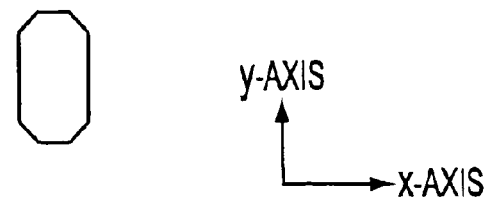
Related Art   FIG. 8(e)

COUPLING OF LIGHT FROM A NON-CIRCULAR LIGHT SOURCE

CROSS-REFERENCE TO RELATED APPLICATIONS

This application claims priority to Provisional Applications Ser. No. 60/272,304, filed Mar. 2, 2001, and Ser. No. 60/294,590, filed Jun. 1, 2001, the disclosures of which are incorporated by reference.

BACKGROUND OF THE INVENTION

1. Field of the Invention

This invention relates to systems for collecting and condensing light from a non-circular source to a circular target for illumination and projection systems.

2. Background of the Invention

An objective of systems that collect, condense, and couple electromagnetic radiation into a standard waveguide, such as a single fiber or fiber bundle, or that output electromagnetic radiation to a homogenizer of a projector, is to maximize the brightness of the electromagnetic radiation at a target. There are several common systems for collecting and condensing light from a lamp for such illumination and projection systems. Some of these may generally be classified as on-axis systems, in that the lamp, the target, and the optical axis of the reflector are co-linear. Others may be classified as off-axis systems, in that some of the components are not on the optical axis 6.

Ellipsoid reflectors and parabolic reflectors may be used together with imaging lenses in on-axis projection systems. Among the useful characteristics of these systems is their rotational symmetry. Since an output target, e.g. an optical fiber bundle, may also be round, the design is conceptually simplistic and intuitively attractive. These systems, however, suffer from lost brightness at the coupling. This loss of brightness degrades the overall efficiency of the projection system.

FIG. 1 shows a related lamp/reflector configuration in which a lamp 2 is placed at a focus of a parabolic reflector 4. The parabolic reflector 4 collimates reflected light such that the light collected by the reflector 4 is parallel to an optical axis 6. A focusing lens 8 is used to collect the collimated beam and focus the light into a target 10. The configuration shown in FIG. 1 may be seen to have rotational symmetry about the optical axis.

FIG. 2 shows another related lamp/reflector configuration in which a lamp 12 is placed at a first focus 14 of an ellipsoid reflector 16 and a target 18 is placed at a second focus 20. This configuration possesses rotational symmetry about an optical axis 22 as well.

The configurations shown in FIGS. 1 and 2 are on-axis systems, since the components are, in general, aligned along an optical axis. A typical intensity profile 30 of the output of such systems is shown in FIG. 3. The output may be seen to possess rotational symmetry as well, with an intensity peak 32 at the center. Due to the nature of these two systems, however, light emitted at various angles from the lamp is magnified differently. The brightness of the light is thus diminished at the target.

A collecting and condensing system such as that shown in FIG. 4, known as an off-axis system, may be used to produce 1:1 magnification of the light at a target. The system shown in FIG. 4 consists of a lamp 42, a primary reflector 44, and a target 46. A retro-reflector 48 may be used to increase the overall efficiency and brightness of the system.

A cross-section of a collecting and condensing system using two symmetric parabolic reflectors is shown in FIG. 5. Light emitted from a lamp 52 is collected and collimated by the first parabolic reflector 54. Rays a, b, and c illustrate three possible paths the light may take from the lamp to a target. Ray a, which has the shortest distance to travel to the first parabolic reflector 54, has the highest divergence angle of the three. Ray c, on the other hand, has the shortest distance to travel to the first parabolic reflector 54 but produces the smallest divergence angle. Ray b is shown to be in the middle and has a divergence angle in the middle of the range.

Rays a, b, and c are reflected at locations on the second parabolic reflector 56 that corresponding to their reflections on the first parabolic reflector 54. The distance traveled by each ray from the second parabolic reflector 56 to the target 58 is thus the same as the corresponding distance between the lamp 52 and the first parabolic reflector 54. Each ray may consequently be focused onto the target 58 with similar divergence at each reflector. The brightness of the arc at the target is preserved as a result of unit magnification. Neither of the configurations shown in FIG. 4 nor 5, however, possess rotational symmetry about an optical axis.

Neither of the configurations shown in FIG. 4 nor 5 possess rotational symmetry. The image of the arc at the target is the image of the arc viewed from the side, and thus bears the same length and width as the arc itself.

FIG. 6 shows the non-symmetrical intensity profile 60 of the image of an arc at the target of either of the configurations shown in FIG. 4 or 5. It would be desirable for a shape of a target to match the non-symmetric intensity profile of the image of the arc.

U.S. Pat. No. 4,757,431, e.g, the disclosure of which is incorporated by reference, describes an improved condensing and collecting system employing an off-axis spherical concave reflector. Such a system enhances the maximum flux that illuminates a small target and thus the amount of flux density collectable by the target. U.S. Pat. No. 5,414,600, the disclosure of which is incorporated by reference, in which the concave reflector is an ellipsoid, and U.S. Pat. No. 5,430,634, the disclosure of which is incorporated by reference, in which the concave reflector is a toroid, improved further on this system.

These systems provide 1:1 magnification of the light source at the target, thus preserving the brightness of the arc. The image of the arc, however, is presented at the target. Since the image of the arc is not usually circular, it does not necessarily match well with the target. Arcs are generally approximately elliptical in shape, and possess a certain aspect ratio. This aspect ratio is generally proportional to the length of the arc, so that longer arcs have larger aspect ratios. As a result, the image of the arc at the target may not be optimized for coupling into, e.g. a round optical fiber or a projection engine.

It may also be desirable to match the light incident on a target to the numerical aperture (NA) of a target. The NA of a target, e.g. an output fiber, is related to the angle of the acceptance cone of the light being received. The NA may thus determine how much of the incident light is actually coupled into the output fiber. In the case of a projection engine, e.g. the projection lens and related optical train may determine the NA at the light entrance. It may also be desirable for maximum collection efficiency for the light from the lamp to have an NA similar to that of the target.

In FIG. 7 is shown a geometrical representation of the angles of emission of light from an arc lamp. The axis of the arc is assumed to be on the y-axis. The two emission angles are $\Theta_x$ and $\Theta_y$. The angle of emission $\Theta_x$ of an arc generally extends about 45 degrees above and below the x-z plane, while $\Theta_y$ encompasses a full 360-degree circle around the y-axis. The light from the arc may be seen to be non-symmetrical when viewed from a point of view in the x-z plane.

The light from the arc may further be seen to have an aspect ratio greater than one when viewed from the side, i.e. from a point of view in the x-z plane. A reflector can be designed to capture all this light and focus it into a target. It may be desirable, however, for the reflector to cooperate with beam transforming optics such that when the collected light is coupled into the input aperture of the target it is actually useable.

FIG. 8 shows various configurations of input apertures for a target. The input apertures generally have aspect ratios greater than one. The aspect ratios of the input apertures may thus be made to be similar to the aspect ratio of the emission area of an arc lamp viewed from the side. Matching an input aperture at the target to an arc, however, does not necessarily match it with the final output device, e.g. a fiber or projection engine. It would be desirable, therefore, for a transforming device to transform the aspect ratio and the NA of the input light into a satisfactory aspect ratio and NA for the output device.

FIG. 9 shows the output of a typical arc lamp. The light output may be seen to be within a 90° angle in the direction along the axis of the lamp and 360° around the lamp. In using the dual paraboloid or dual ellipsoid reflector configurations with retro-reflectors, the focused light at the target may have a numerical aperture (NA) of 1.0 in the z-direction and 0.7 in the x-direction and y-direction as shown in FIG. 10. These coupling systems do not have a rotational symmetry and the resulting NA may be rectangular.

In practice, light with such a large NA has to be transformed such that the NA is smaller and the area is larger following the brightness principle. FIG. 11 shows a typical tapered light pipe that does such a transformation. Following the brightness principle, the relationship is:

$$d1 \times NA1 = d2 \times NA2$$

Normally, the light pipe is designed such that the output NAs are the same in both directions as shown in FIG. 12.

FIG. 13 shows a three-quarter view of the light pipe shown in FIG. 11. Due to the finite length of the light pipe, the light exiting the light pipe does not follow the formula exactly and the output NA is usually larger than theory would predict. Further, the output is generally not telecentric.

SUMMARY OF THE INVENTION

In one aspect, the invention provides a NA equalizing apparatus including a transmission element with an input surface, in which the input surface has a first input dimension and a second input dimension, with the second input dimension being substantially orthogonal to the first input dimension, and the first input dimension may be substantially unequal to the second input dimension.

In another aspect, the invention provides a NA equalizing system including a reflector having a first and a second focal points, with a source of electromagnetic radiation located proximate to the first focal point to produce rays of radiation that are reflected by the reflector and converge substantially at the second focal point. A transmission element to be illuminated with at least a portion of the electromagnetic radiation emitted by the source is placed so that an input surface is located proximate to the second focal point to collect the electromagnetic radiation. The input surface has a first input dimension and a second input dimension, with the second input dimension being substantially orthogonal to the first input dimension, and the first input dimension may be substantially unequal to the second input dimension.

BRIEF DESCRIPTION OF THE DRAWINGS

FIG. 8: various configurations of input apertures for a target;

DETAILED DESCRIPTION OF THE PREFERRED EMBODIMENTS

Figure 14:
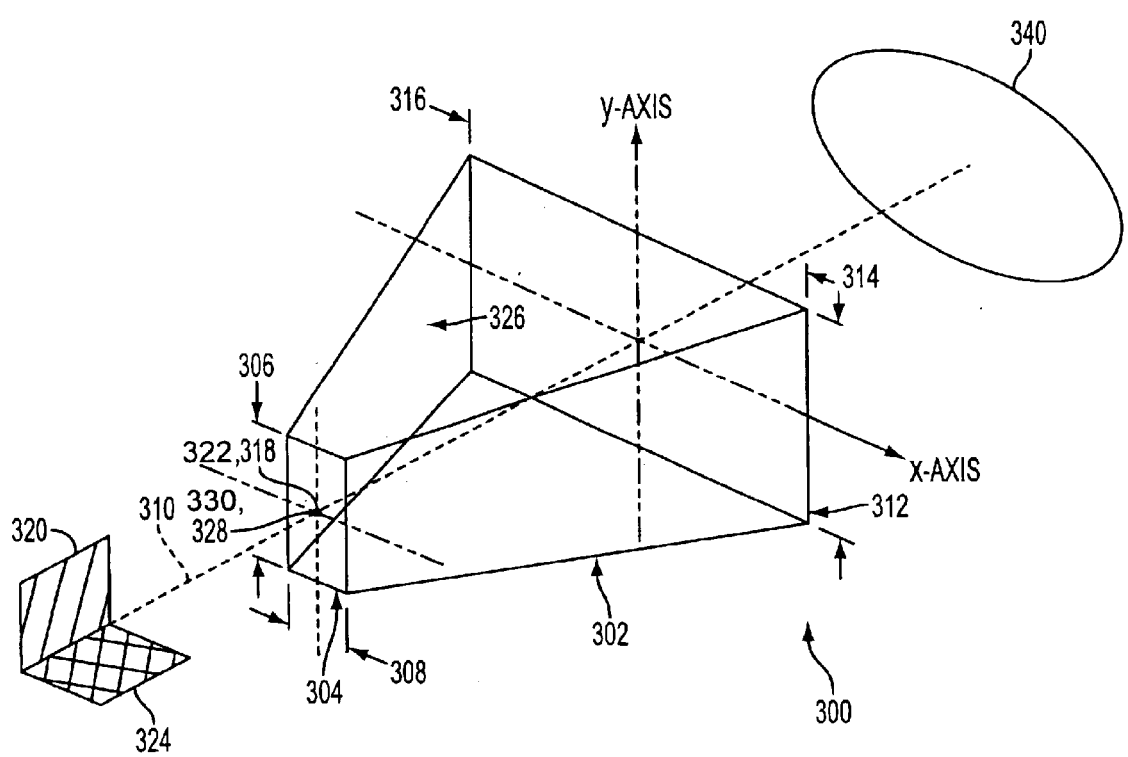
FIG. 14: A three-quarter view of a transmission element according to a first embodiment of the invention.

In FIG. 14 is shown a NA equalizing apparatus 300 according to one embodiment of the invention. Apparatus 300 includes a transmission element 302 with an input surface 304. A first input dimension 306 and a second input dimension 308, with second input dimension 308 being substantially orthogonal to first input dimension 306, may define input surface 304. First input dimension 306 may be substantially unequal to second input dimension 308. First input dimension 306 may be, e.g. substantially larger than or smaller than second input dimension 308. Input surface 304 may have a shape such as, e.g. an ellipse, a rectangle, an oval, a double circle, a hexagon, or an octagon.

Transmission element 302 also has an axis 310 and an output surface 312. Output surface 312 may be defined by a first output dimension 314 and a second output dimension 316, with second output dimension 316 being substantially orthogonal to first output dimension 314, and second output dimension 316 being substantially parallel to the second input dimension 308. Output surface 312 may be substantially convex. In further refinements, output surface 312 may be substantially hemispherical, toroidal, flat, or aspherical. Output surface 312 may have a shape such as, e.g. a circle, a rectangle, a square, a pentagon, a hexagon, or an octagon. In one embodiment a lens may be disposed proximate to output surface 312.

An aspect ratio of the output surface 312 may be designed to match that of the application, such as, e.g. a projector, which may have an aspect ratio of 3:4, or 9:16.

Transmission element 302 may be comprised of a material such as, e.g. glass, acrylic, silicon, plastic, or quartz. In one embodiment, transmission element 302 may be, e.g. a hollow tube. In a preferred embodiment, transmission element 302 may have, e.g. an inner surface 326 coated with a substantially reflective coating.

In one embodiment, input surface 304 transitions to output surface 312, in, e.g. a straight transition, a curved transition, a tapered transition, a parabolic transition, or a hyperbolic transition.

In a preferred embodiment, first input dimension 306 and a second input dimension 308 substantially intersect axis 310. In this preferred embodiment, first output dimension 314 and a second output dimension 316 also substantially intersect axis 310. A first input NA 318 may be in a plane 320 of the first input dimension 306 and the axis 310, and a second input NA 322 may be in a plane 324 of second input dimension 308 and axis 310. A first output NA 328 may be in a plane 320 of the first input dimension 306 and the axis 310, and a second output NA 330 may be in a plane 324 of second input dimension 308 and axis 310.

Input aperture size, aspect ratio and NA can be optimized for the output requirements according to the brightness principle using the relationships:

first input dimension 306×first input NA 318=first output dimension 314×first output NA 328; and second input dimension 308×second input NA 322= second output dimension 316×second output NA 330.

In a preferred embodiment, first and second output NAs 328 and 330 are substantially equal in both plane 320 and plane 324. Thus:

first output NA 328=second output NA 330 so first input dimension 306×first input NA 318/first output dimension 314=second input dimension 308×second input NA 322/second output dimension.

In this case, first ratio of a first product of first input dimension 306 and first input NA 318 to first output dimension 314 may be substantially equal to a second ratio of a second product of second input dimension 308 and second input NA 322 to second output dimension 316.

First input dimension 306 may be, e.g. matched to a length of an arc used as a source of electromagnetic radiation. Such a length, e.g. may be approximately 1.3 mm. Second input dimension 308 may be, e.g. matched to a width of an arc used as a source of electromagnetic radiation. Such a length, e.g. may be approximately 0.65 mm. First input NA 318 may be, e.g. 0.7, while second input NA 322 may be 1.0.

A typical plastic optical fiber may have an NA in either direction of 0.5. To match the output of a transforming optic to the plastic optical fiber, then first output NA 328=second output NA 330=0.5.

Since first output NA 328=0.5=first input dimension 306×first input NA 318/first output dimension 314; and second output NA 330=0.5=second input dimension 308× second input NA 322/second output dimension 316; then first output dimension 314=first input dimension 306×first input NA 318/0.5; and second output dimension 316=second input dimension 308×second input NA 322/0.5.

So, filling in terms, first output dimension 314=(1.3 mm)(0.7)/0.5=1.82 mm second output dimension 316=(0.65 mm)(1.0)/0.5=1.3 mm.

Figure 15:
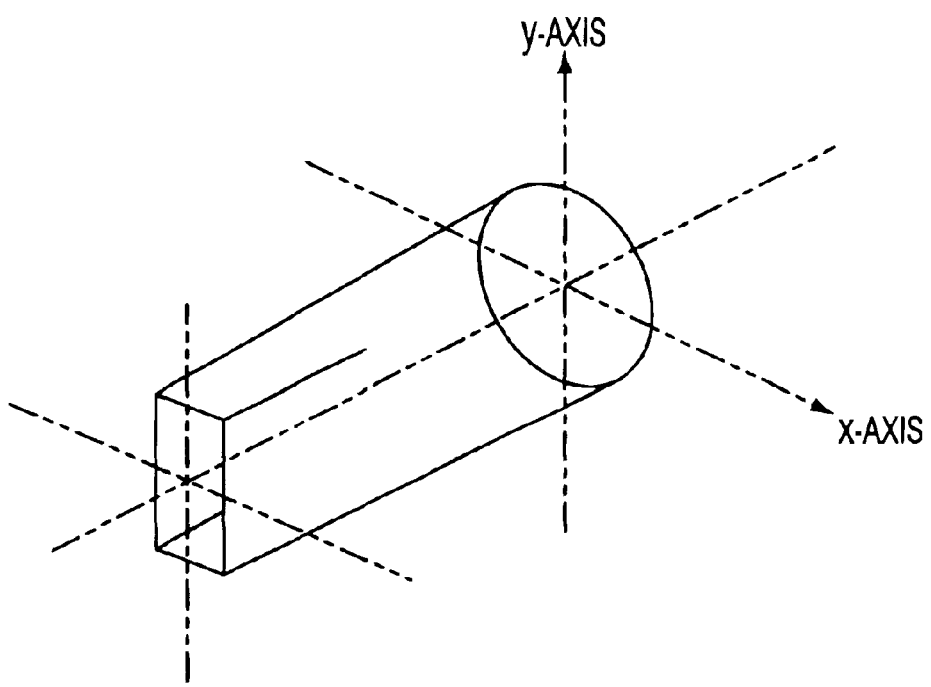
FIG. 15: A three-quarter view of a transmission element according to a second embodiment of the invention.

In FIG. 15 is shown a three-quarter view of a transforming optic with a rectangular input aperture and a circular output aperture suitable for coupling into a circular output fiber. For a typical short arc lamp, length of the arc may be, e.g. 1.3 mm, and the width of the arc may be approximately 0.65 mm. The image of the arc at a target, such as an input to a transforming optic, may have a horizontal size of 0.65 mm and NA of 1.0, and a vertical size of 1.3 mm and NA of 0.7. The input end may be, e.g. rectangular or oval in shape.

For coupling into a large core fiber using a lamp with longer arc, the relationships can be scaled. For example, for an output fiber 12 mm in diameter, use a scaling factor of 6.6. In this case, the length of the arc can be as long as 8.6 mm. In practical implementations, the arc may not be confined within the described area. As a result, a margin may be needed for efficient coupling.

For another example, consider a projector system with a 3:4 aspect ratio and an NA of 0.5 in either direction. An output aperture of 4 mm and 3 mm in the horizontal and vertical directions, respectively, would give such an aspect ratio. In this case the respective NAs at the output are 0.1625 and 0.3033, which do not match well. If, however, the axes were rotated giving an output aspect ratio of 4:3, the respective NAs at the output would be 0.2167 and 0.2275, which are very close to each other and would couple efficiently through the projector system.

For another example, an aspect ratio of 16:9, the respective NAs at the output are 0.0406 and 0.1011. For an aspect ratio of 9:16, the respective NAs at the output are 0.0722 and 0.0569.

Figure 1:
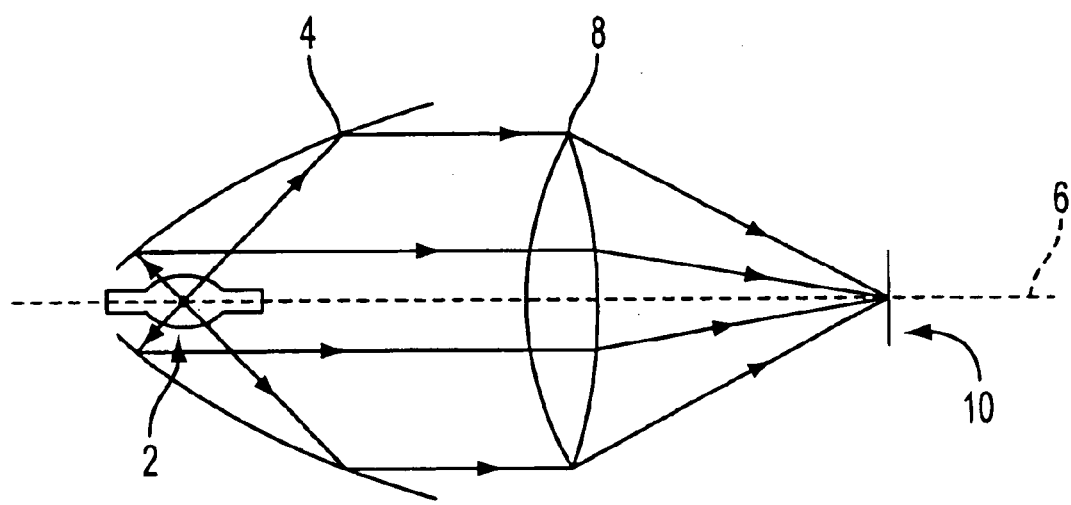
FIG. 1: A schematic diagram of an on-axis parabolic system with condensing lens.
Figure 2:
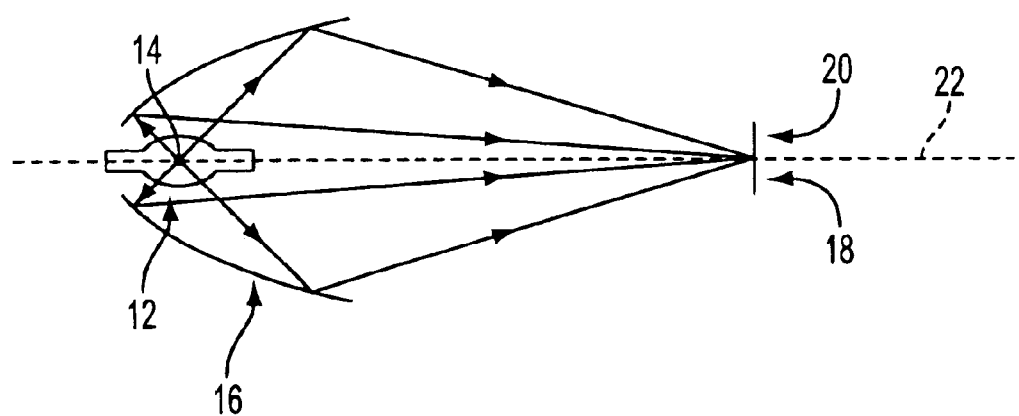
FIG. 2: A schematic diagram of an on-axis ellipsoid system.
Figure 3:
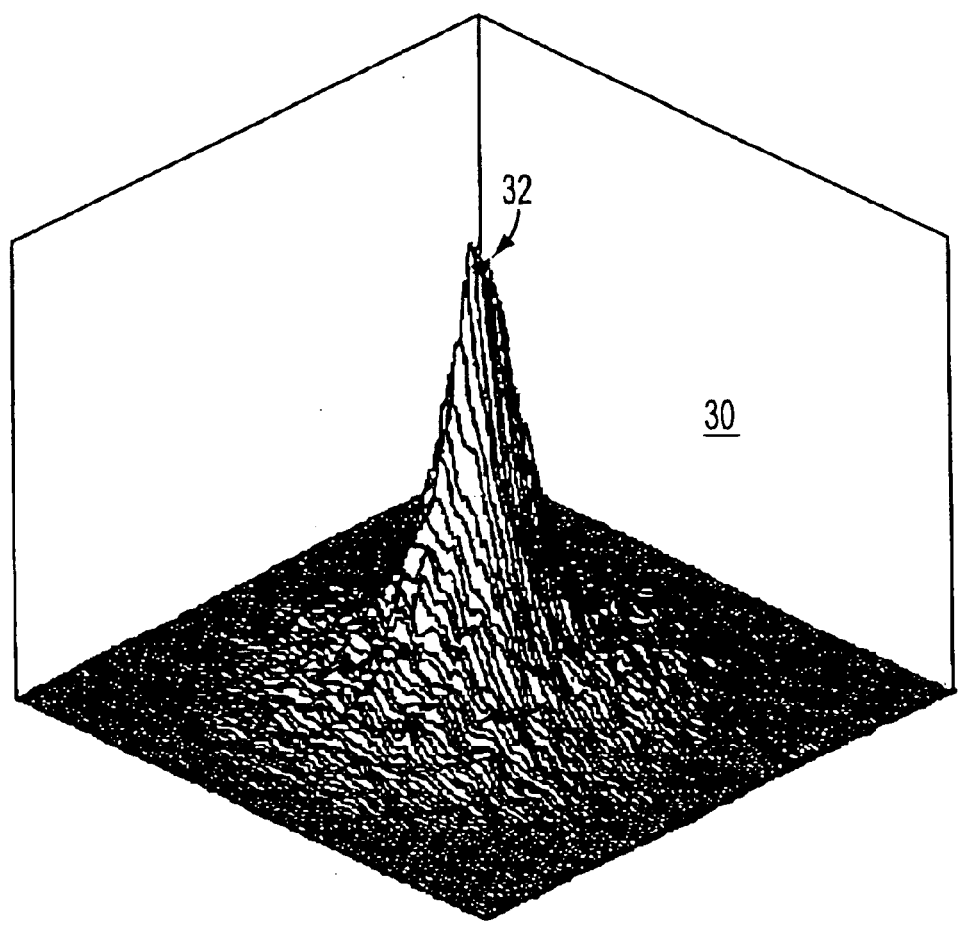
FIG. 3: A diagram of an output intensity profile at the target of a typical on-axis system.
Figure 4:
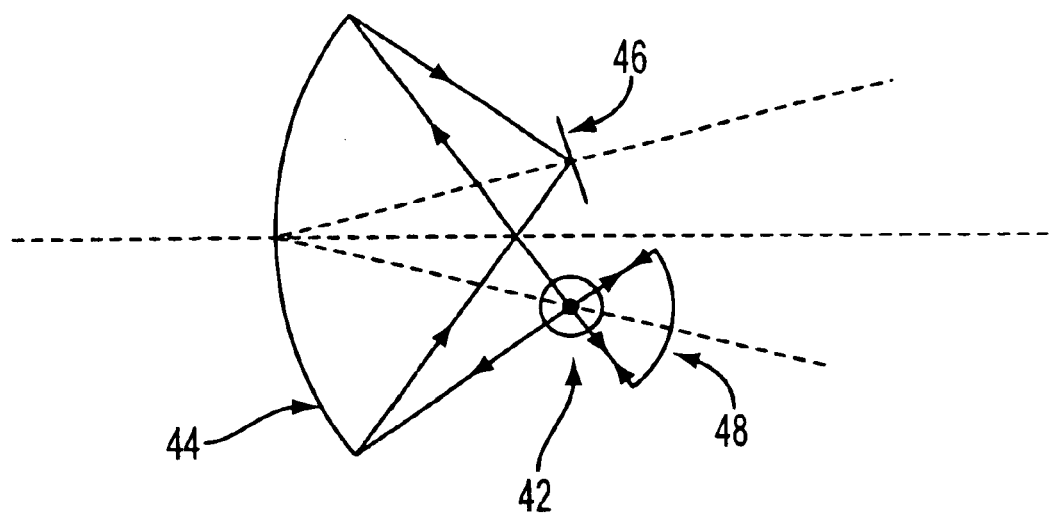
FIG. 4: A schematic diagram of an off-axis system with concave primary reflector and a retro-reflector.
Figure 5:
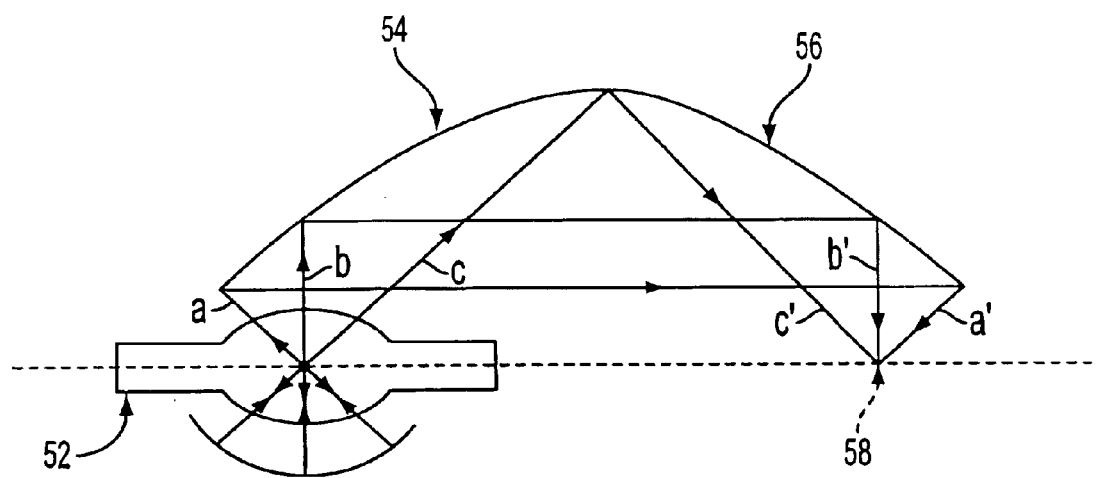
FIG. 5: A schematic diagram of a dual paraboloid system.
Figure 6:
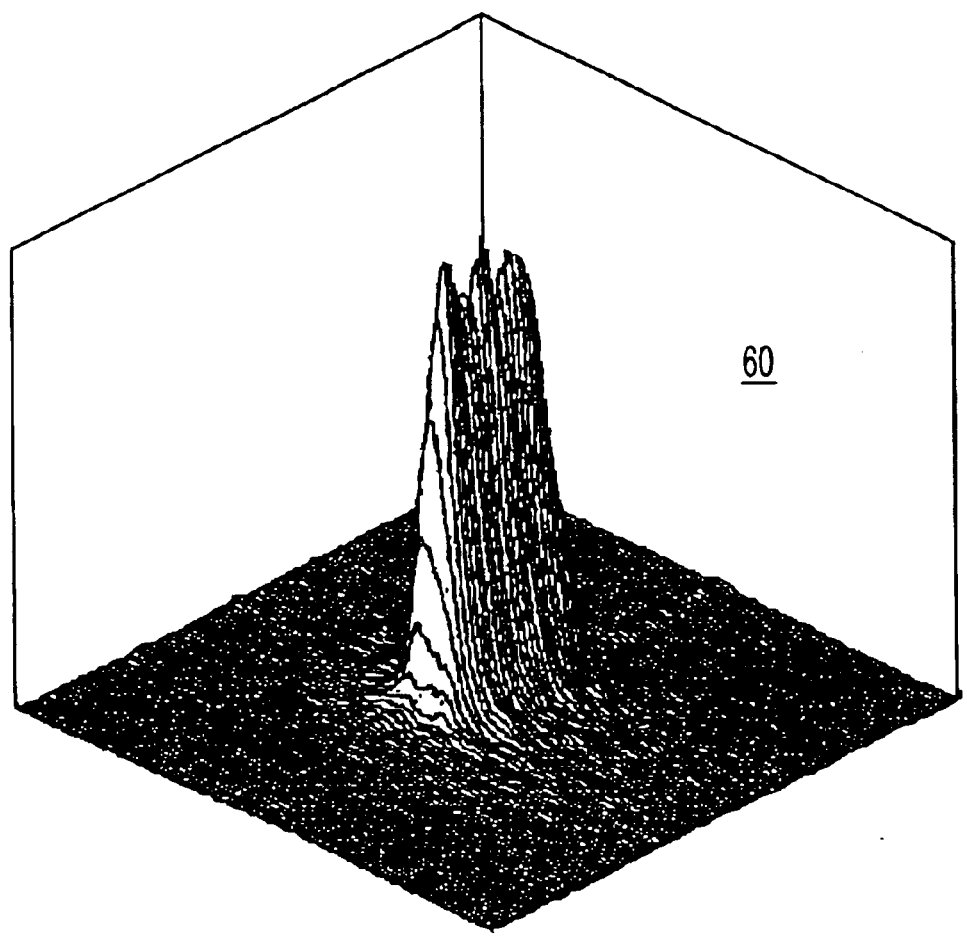
FIG. 6: A diagram of an output intensity profile at the target of a typical off-axis system.
Figure 7:
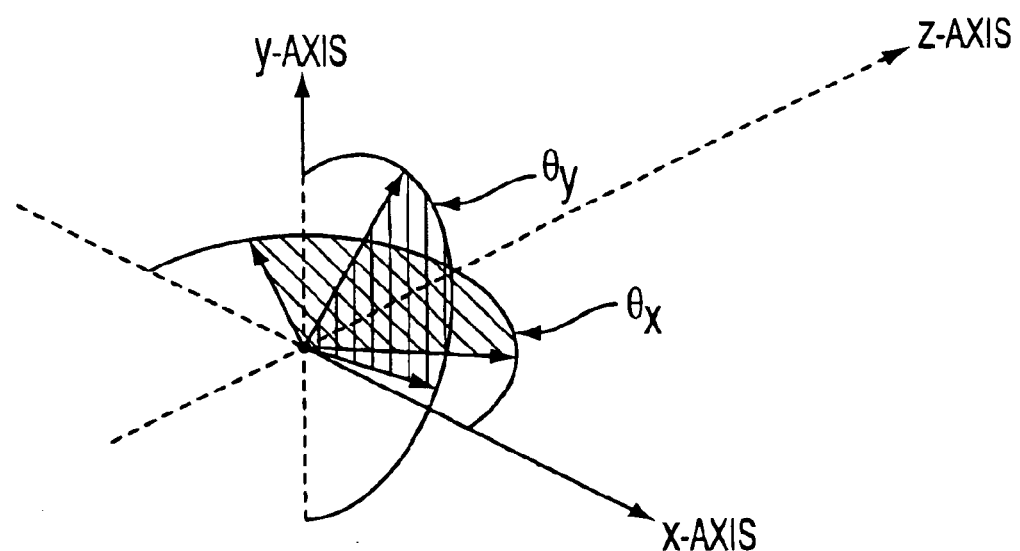
FIG. 7: A diagram of an output angular light distribution profile of a typical arc lamp.
Figure 9:
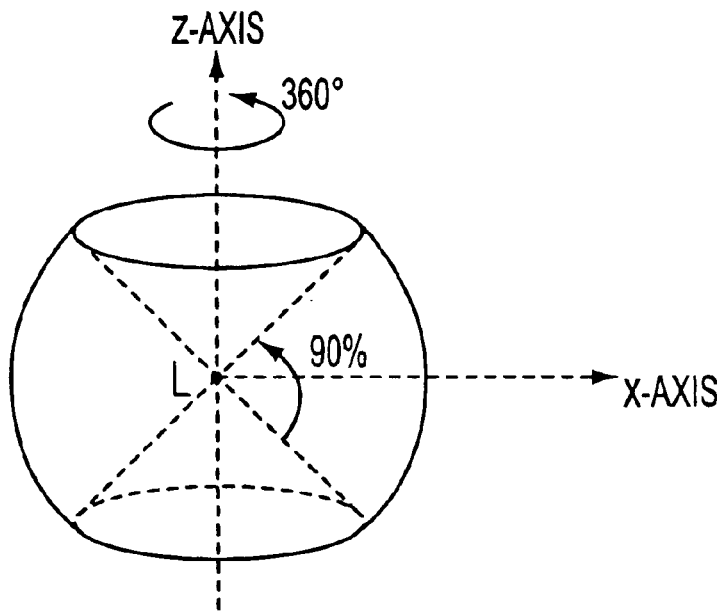
FIG. 9: A three-quarter view of the light distribution from a typical arc lamp.
Figure 10:
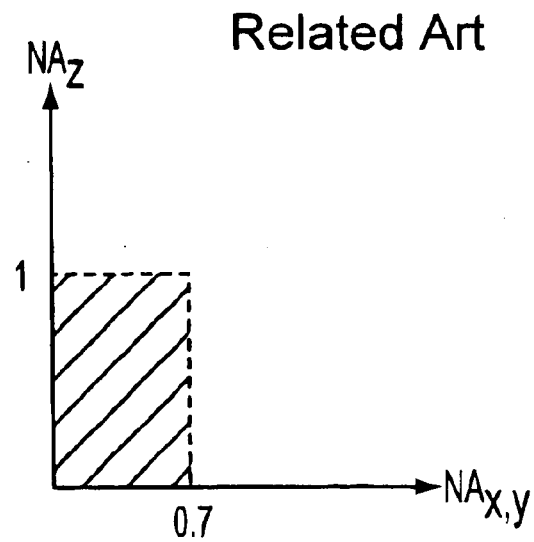
FIG. 10: A diagram of a NA of light output from an arc lamp in the x and y and z-directions.
Figure 11:
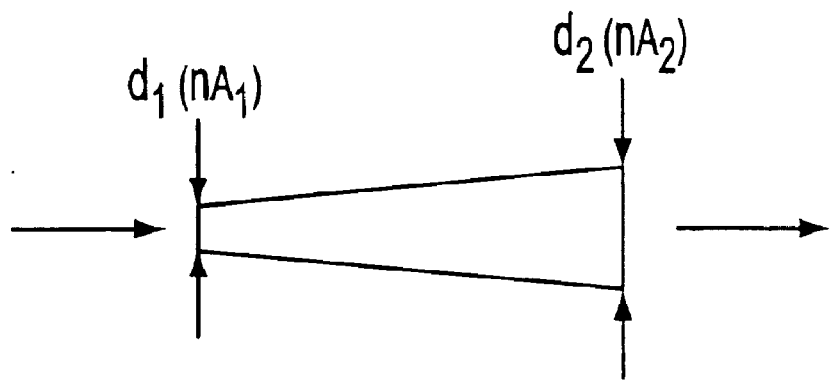
FIG. 11: A schematic diagram of a tapered light pipe.
Figure 12:
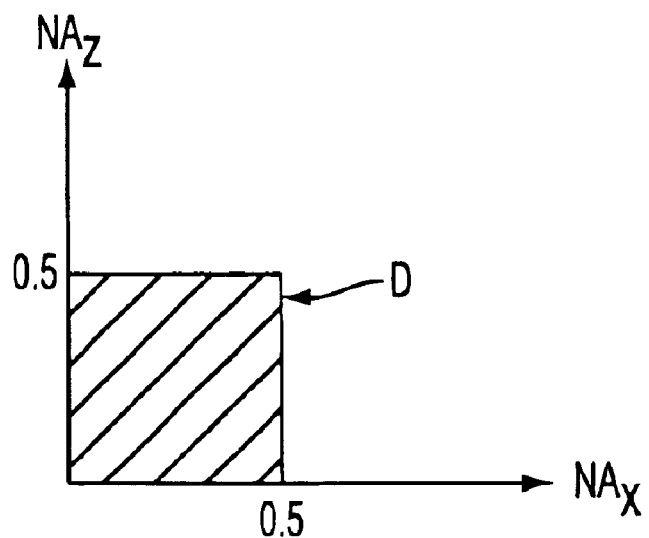
FIG. 12: A diagram of the NAs of the light output from an arc lamp in the x and y directions.
Figure 13:
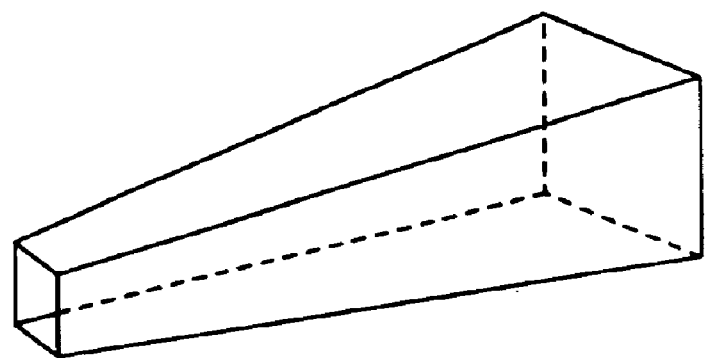
FIG. 13: A three-quarter view of a tapered light pipe.
Figure 16:
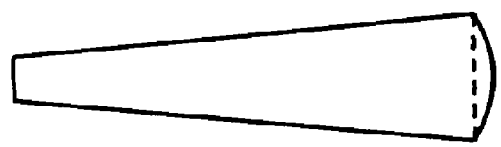
FIG. 16: A schematic diagram of a tapered light pipe with convex output surface.

FIG. 16 shows an improvement to bring the output back to be telecentric using a convex surface at the output. Although the NAs shown in FIG. 12 are equal in the horizontal and the vertical directions, the diagonal direction has a larger NA which, when coupled into a rotationally symmetric device, results in loss.

Figure 17A:
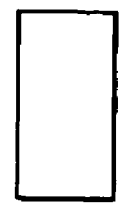
FIG. 17: A schematic diagram of various input faces for a tapered light pipe.
Figure 17B:
Figure 17C:
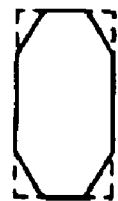

FIG. 17 shows various configurations of input surfaces that can be used. FIG. 17(b) shows an elliptical input surface that would improve the transformation such that the diagonal NA issue may be greatly reduced or removed. An octagonal input surface may also be used as shown in FIG. 17(c).

Figure 18:
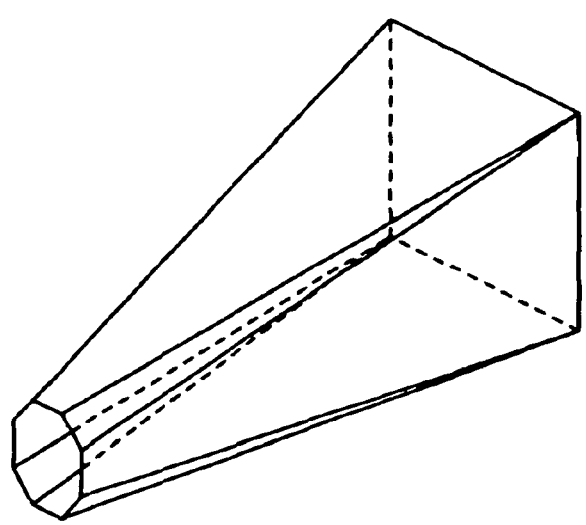
FIG. 18: a three-quarter view of a transmission element according to a third embodiment of the invention.

FIG. 18 shows a three-quarter view of an octagonal input light pipe. The output surface is shown flat in the diagram, although the output surface could be convex to improve the telecentricity of the output.

Figure 19:
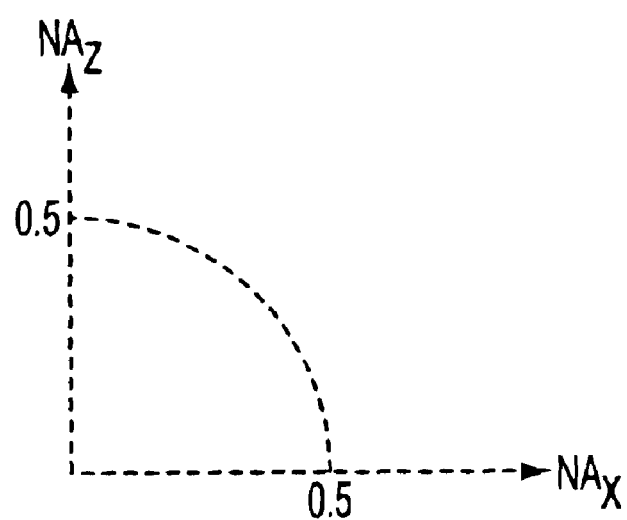
FIG. 19: a diagram of a NA of an octagonal light pipe.

FIG. 19 shows the output NA of the system where the NA is constant in all directions and, as a result, would be very lossy when coupled into a rotationally symmetric system. The intensity profiles of most lamps are not rectangular. Instead, they are generally elliptical. As a result, the loss from removing the corners of the rectangle at the input surface to produce an ellipse or an octagon may be very small compared to the loss due to the larger diagonal NA.

The input surface as described may be elliptical or octagonal. Any number of sides may be used. For example, 12 sides can be used to approximate the ellipse better.

Figure 20:
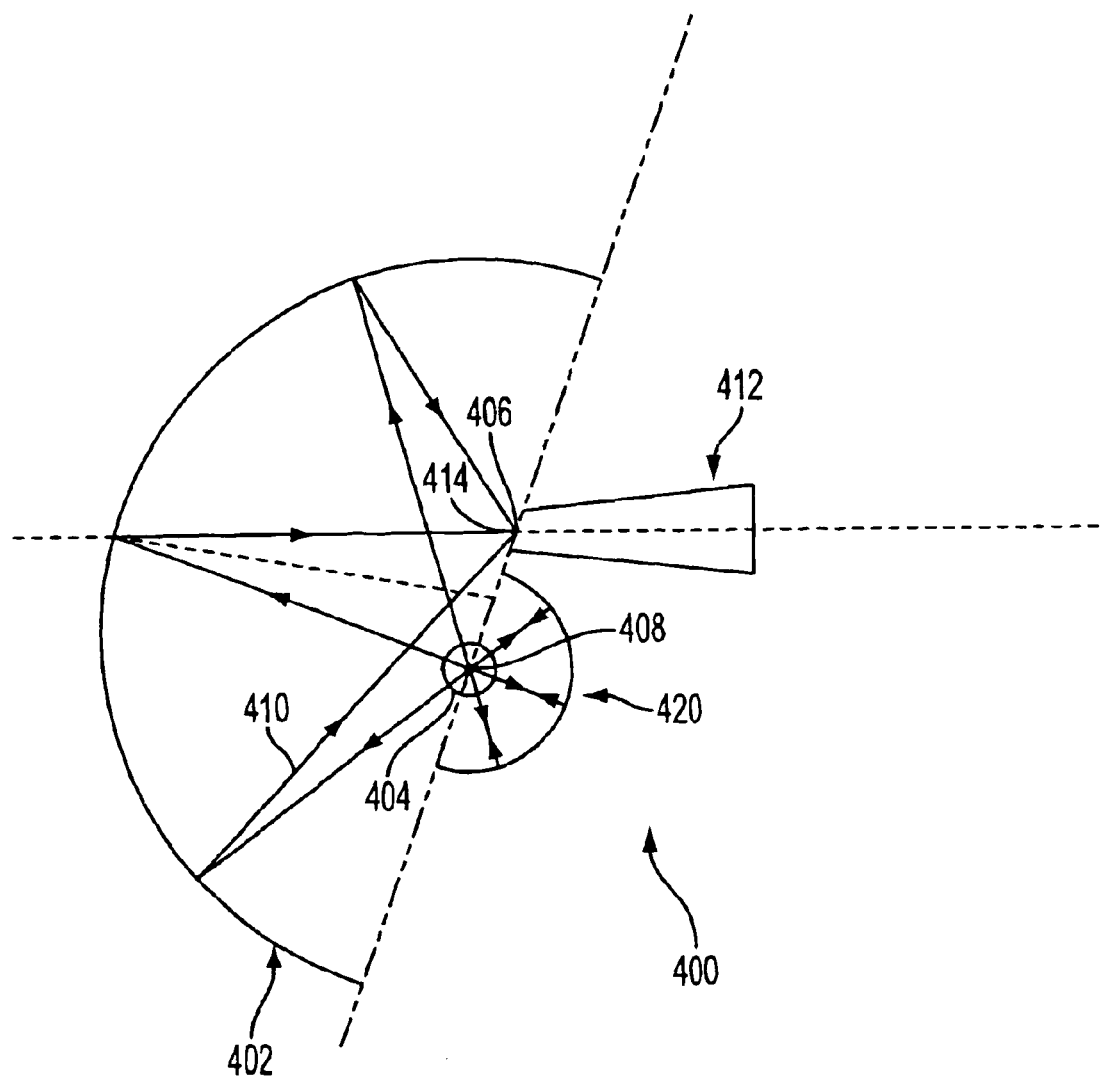
FIG. 20: A schematic diagram of an embodiment of the invention using an off-axis system with concave primary reflector.

In FIG. 20 is shown a NA equalizing system 400 according to another embodiment of the invention. System 400 includes a reflector 402 having a first and a second focal points 404, 406. A source of electromagnetic radiation 408 may be located proximate to first focal point 404 to produce rays of radiation 410 that are reflected by reflector 402 and converge substantially at second focal point 406. Source 408 may be, e.g. a light-emitting arc lamp, such as a xenon lamp, a metal halide lamp, an HID lamp, or a mercury lamp. In another embodiment, source 408 may be, e.g. a filament lamp.

Reflector 402 may be, e.g. at least a portion of a substantially ellipsoid surface of revolution, at least a portion of a substantially toroidal surface of revolution, or at least a portion of a substantially spheroidal surface of revolution. Reflector 402 may have a coating that reflects only a pre-specified portion of electromagnetic radiation spectrum, such as, e.g. only visible light radiation, a pre-specified band of radiation, or a specific color of radiation.

A transmission element 412 to be illuminated with at least a portion of electromagnetic radiation 410 emitted by source 408 may be placed with an input surface 414 located proximate to second focal point 406 to collect electromagnetic radiation 410. A first input dimension and a second input dimension, with second input dimension being substantially orthogonal to first input dimension, may define Input surface 414. First input dimension may further be substantially unequal to second input dimension.

In one embodiment, a portion of electromagnetic radiation 410 emitted by source of electromagnetic radiation 408 impinges directly on reflector 402 and a portion of electromagnetic radiation 410 does not impinge directly on reflector 402. System 400 may further include an additional reflector 420 constructed and arranged to reflect at least part of portion of electromagnetic radiation 410 that does not impinge directly on reflector 402 toward reflector 402 through first focal point 404 of reflector 402 to increase a flux intensity of converging rays 410. Additional reflector 420 may be, e.g. a spherical retro-reflector disposed on a side of source 408 opposite reflector 402 to reflect electromagnetic radiation 410 emitted from source 408 in a direction away from reflector 402 toward reflector 402 through first focal point 404 of reflector 402.

Figure 21:
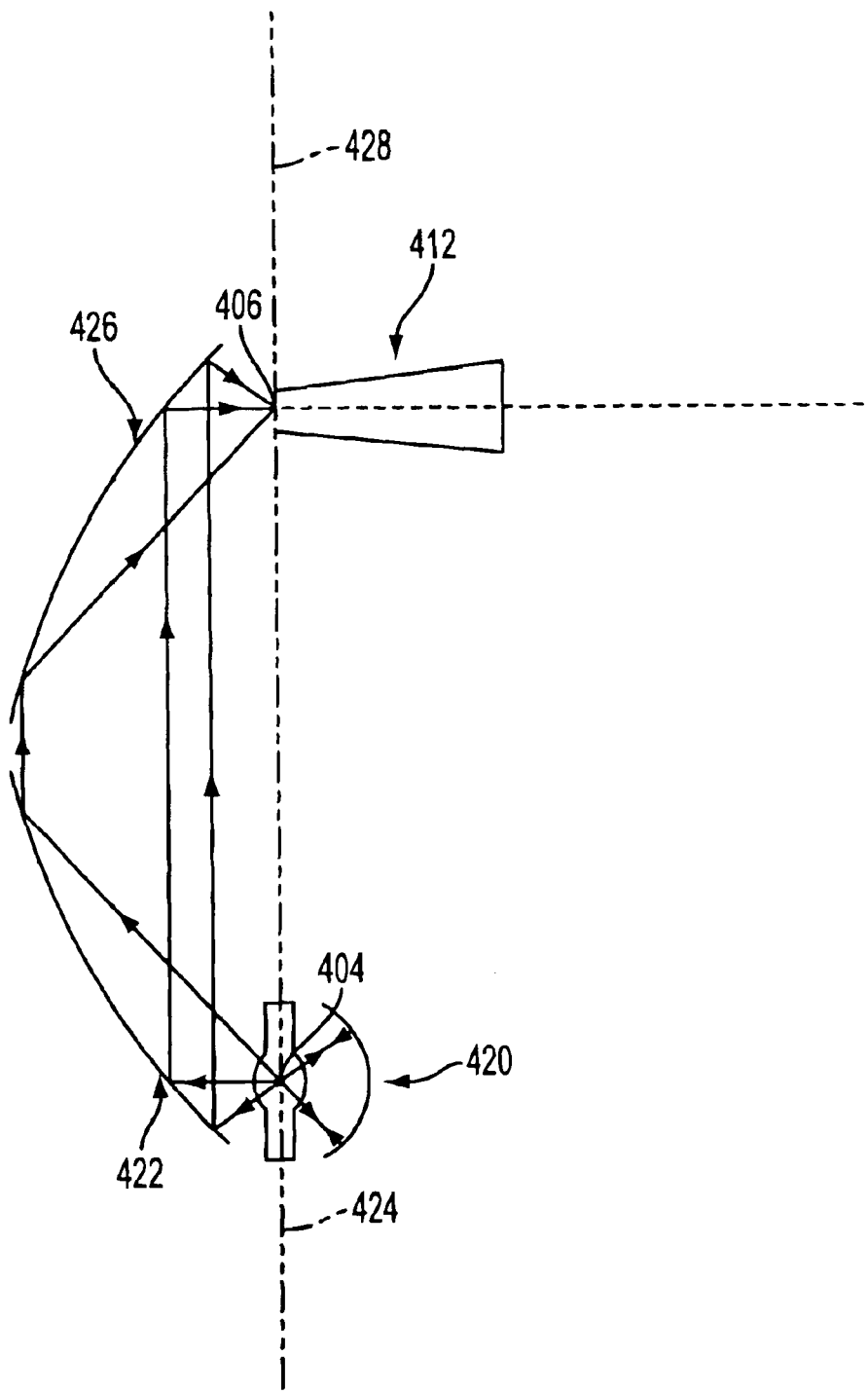
FIG. 21: A schematic diagram of an embodiment of the invention using a dual paraboloid configuration.
Figure 22:
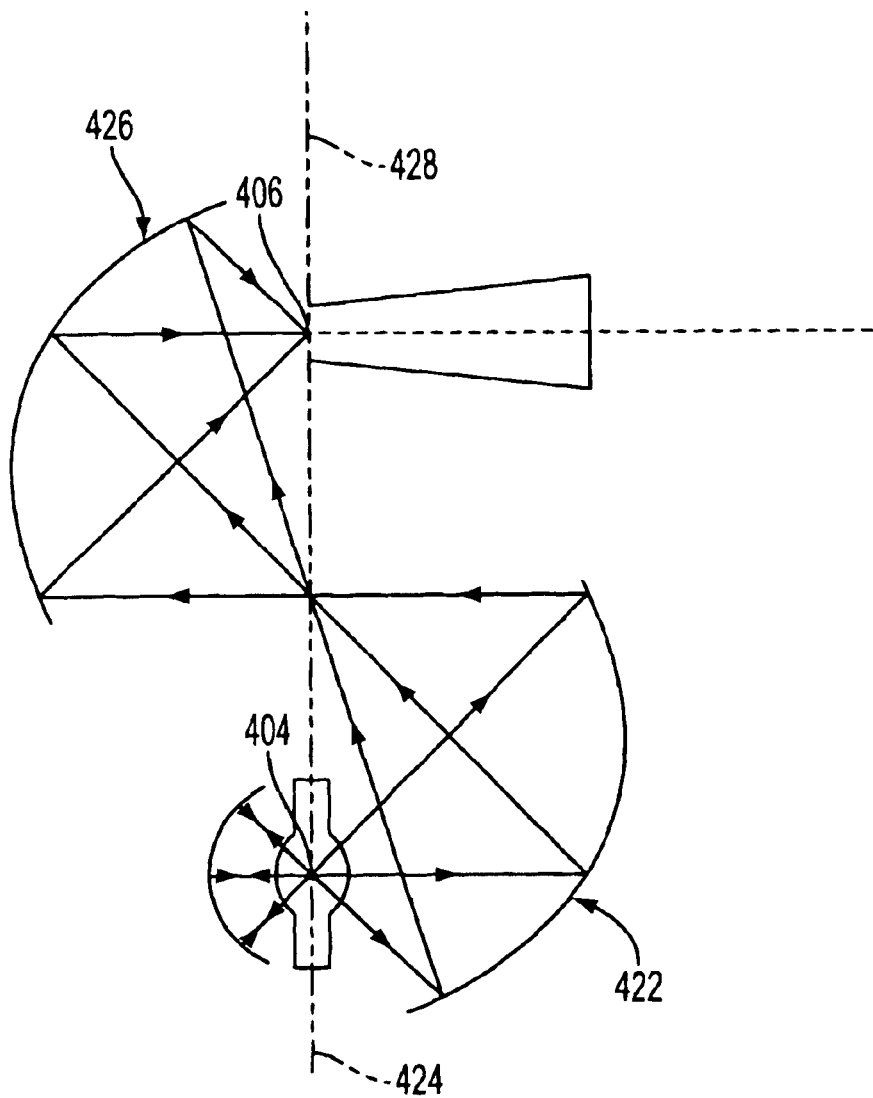
FIG. 22: A schematic diagram of an embodiment of the current invention using the dual ellipsoid configuration.

In a further embodiment, shown in FIG. 21, reflector 402 may be composed of a first reflector 422 having a first optical axis 424 and a second reflector 426 having a second optical axis 428. First focal point 404 may be a focal point of first reflector 422 on first optical axis 424, while second focal point 406 may be a focal point of second reflector 426 on second optical axis 428. Second reflector 426 may be disposed substantially symmetrically to first reflector 422 such that first optical axis 424 may be collinear with second optical axis 428. First and second reflectors 422, 426 may be, e.g. at least a portion of substantially paraboloid surfaces of revolution. In an alternative embodiment, shown in FIG. 22, first and second reflectors 422, 426 may be, e.g. at least a portion of substantially ellipsoid surfaces of revolution.

In further embodiments, first reflector 422 may be, e.g. at least a portion of a substantially hyperboloid surface of revolution while second reflector 426 may be, e.g. at least a portion of a substantially ellipsoid surface of revolution. Or, in the alternative, first reflector 422 may be, e.g. at least a portion of a substantially ellipsoid surface of revolution while second reflector 426 may be, e.g. at least a portion of a substantially hyperboloid surface of revolution.

Figure 23:
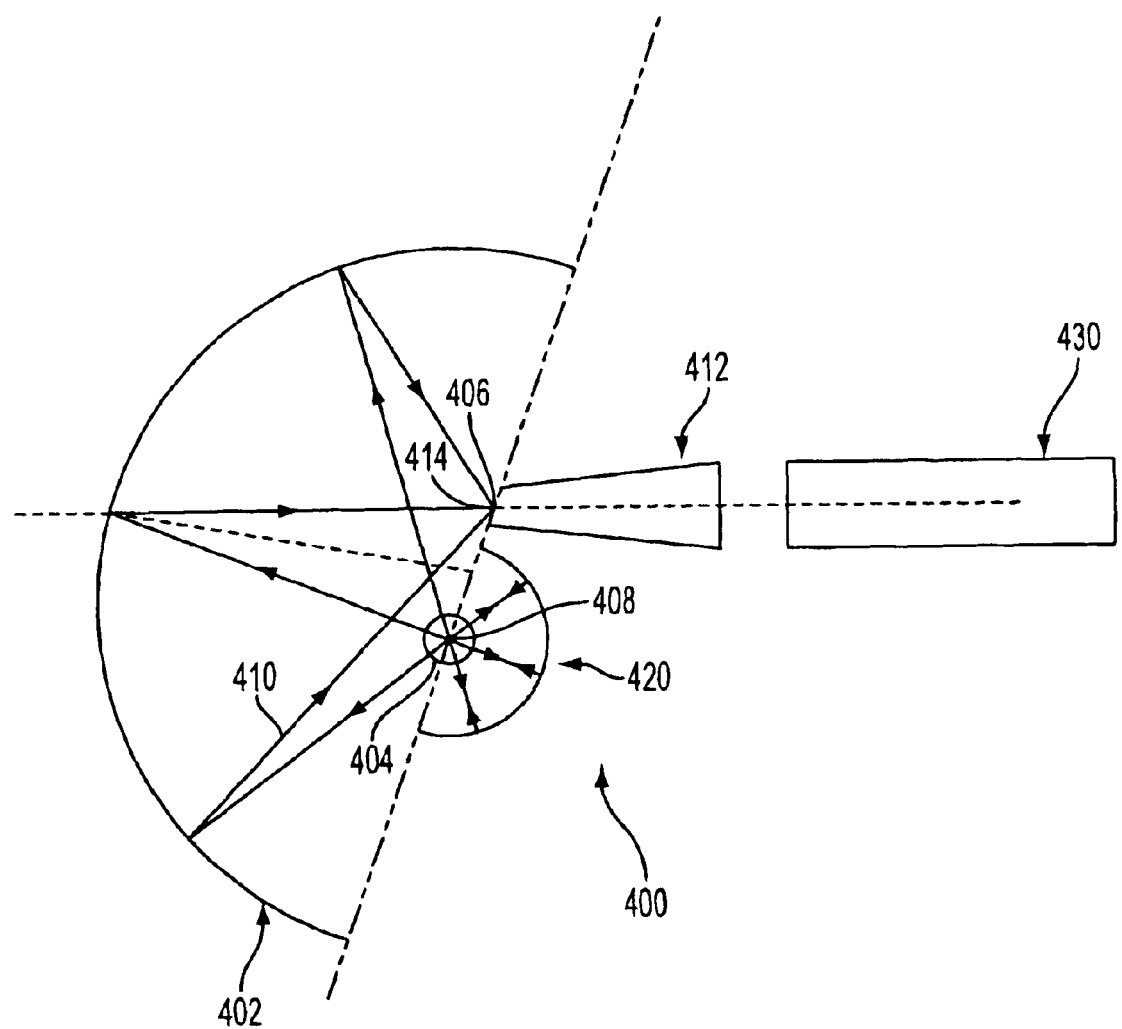
FIG. 23: A schematic diagram of an embodiment of the invention with a waveguide.
Figure 24:
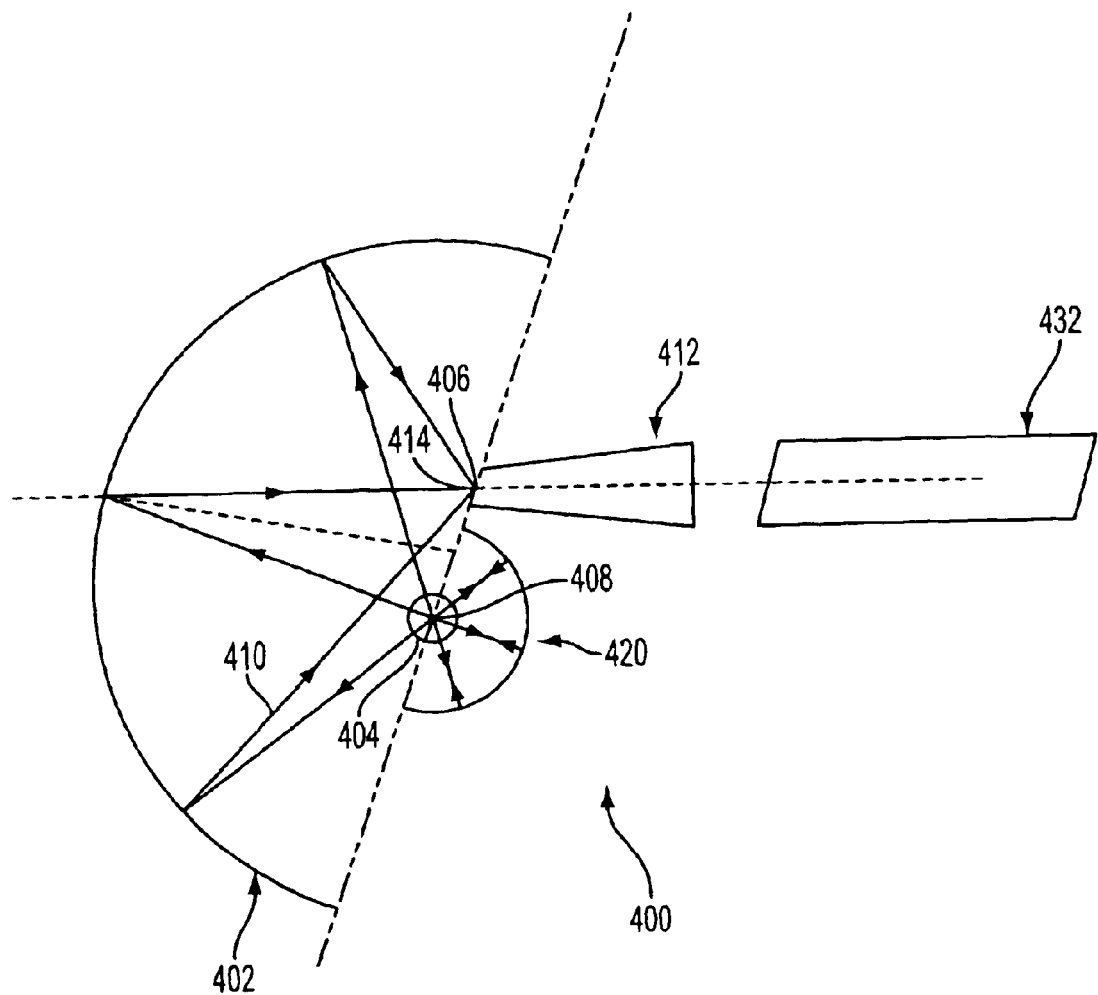
FIG. 24: A schematic diagram of an embodiment of the invention with a fiber optic.

In a further embodiment, shown in FIG. 23, a waveguide 430 may be disposed proximate to transmission element 412 to collect electromagnetic radiation 410. Waveguide 430 may be, e.g. a single core optic fiber, a fiber bundle, a fused fiber bundle, a polygonal rod, a hollow reflective light pipe, or a homogenizer. Waveguide 430 may have, e.g. a cross-section such that waveguide 430 is a circular waveguide, a polygonal waveguide, a tapered waveguide, or a combination thereof. Waveguide 430 may be made of, e.g. quartz, glass, plastic, or acrylic.

Figure 25:
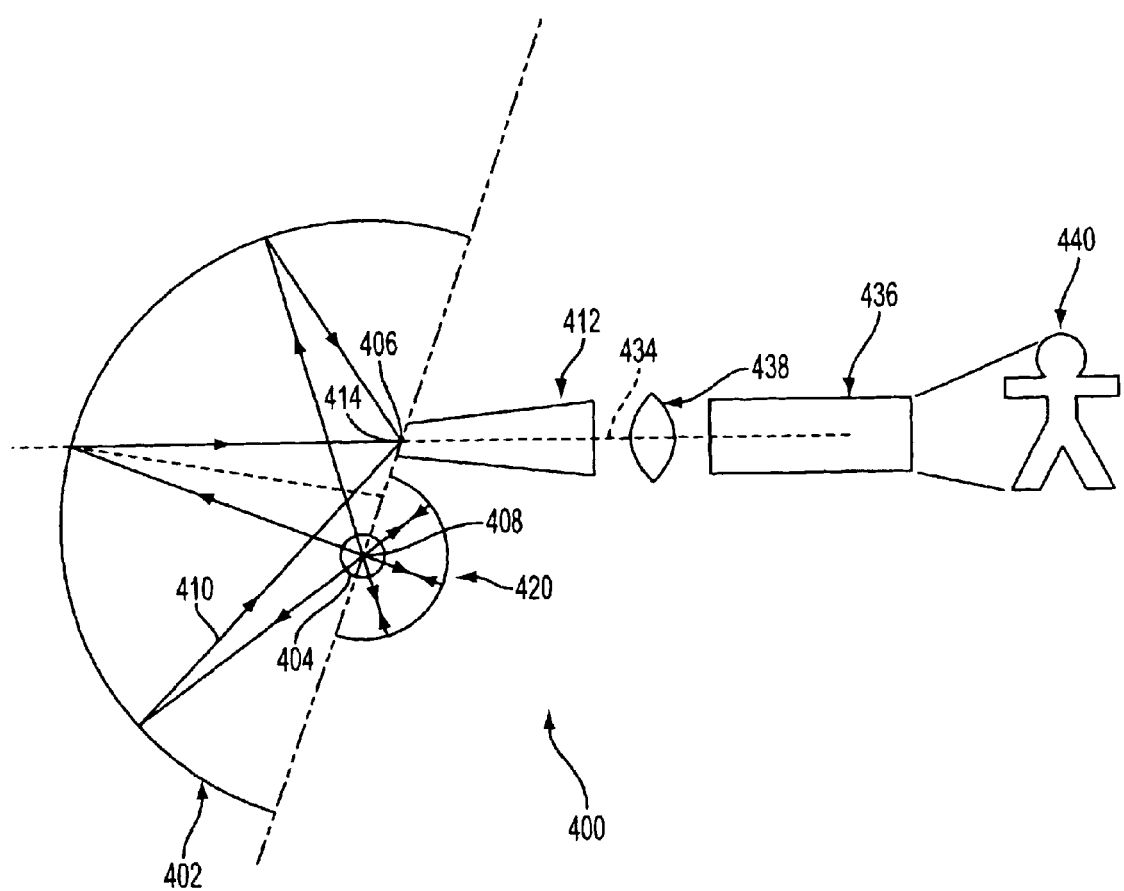
FIG. 25: A schematic diagram of an embodiment of the invention with a projection engine.

In a further embodiment, shown in FIG. 25, a fiber optic 432 may be disposed proximate to transmission element 412, fiber optic 432 being illuminated by radiation 410 collected at transmission element, fiber optic 432 releasing collected radiation 410 to provide for illumination at a desired location.

In a further embodiment, shown in FIG. 26, a condenser lens 434 may be disposed proximate to transmission element 412. An image projection system 436 disposed proximate to an output side 438 of condenser lens 434 may then receive electromagnetic radiation 410 collected and condensed at transmission element 412, and consequently releasing collected and condensed radiation 410 to display an image While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A NA equalizing apparatus comprising:
   a transmission element, said transmission element having an input surface;
   said input surface having a first input dimension and a second input dimension, said second input dimension being substantially orthogonal to said first input dimension; and
   wherein said first input dimension is substantially unequal to said second input dimension; and
   wherein said transmission element comprises further:
   an axis;
   an output surface, said output surface comprising:
   a first output dimension and a second output dimension, said second output dimension being substantially orthogonal to said first output dimension, said second output dimension being substantially parallel to said second input dimension; and
   a first input NA in a plane of said first input dimension and said axis;
   a second input NA in a plane of said second input dimension and said axis;
   wherein a first ratio of a first product of said first input dimension and said first input NA to said first output dimension is substantially equal to a second ratio of a second product of said second input dimension and said second input NA to said second output dimension.

2. The NA equalizing apparatus of claim 1, wherein said first input dimension is substantially larger than said second input dimension.

3. The NA equalizing apparatus of claim 1, wherein said first input dimension is substantially smaller than said second input dimension.

4. The NA equalizing apparatus of claim 1, wherein said input surface has a shape selected from the group consisting of:

an ellipse, a rectangle, an oval, a double circle, a hexagon, and an octagon.

5. The NA equalizing apparatus of claim 1, wherein said output surface comprises a substantially convex output surface.

6. The NA equalizing apparatus of claim 1, wherein said transmission element comprises further a lens disposed proximate to said output surface.

7. The collecting and condensing system of claim 1, wherein said output surface comprises a substantially spherical output surface.

8. The collecting and condensing system of claim 1, wherein said output surface comprises a substantially toroidal output surface.

9. The collecting and condensing system of claim 1, wherein said output surface comprises a substantially flat output surface.

10. The collecting and condensing system of claim 1, wherein said output surface comprises a substantially aspherical output surface.

11. The NA equalizing apparatus of claim 1, wherein said output surface has a shape selected from the group consisting of:

a circle, a rectangle, a square, a pentagon, a hexagon, and an octagon.

12. The NA equalizing apparatus of claim 1, wherein said input surface transitions to said output surface, said transition selected from the group consisting of:

a straight transition, a curved transition, a tapered transition, a parabolic transition, and a hyperbolic transition.

13. The NA equalizing apparatus of claim 1, wherein said transmission element is comprised of a material selected from the group consisting of:

glass, acrylic, silicon, plastic, and quartz.

14. The NA equalizing apparatus of claim 1, wherein said transmission element comprises a hollow tube.

15. The NA equalizing apparatus of claim 14, wherein said hollow tube comprises further an inner surface coated with a substantially reflective coating.

16. The NA equalizing apparatus of claim 1, further comprising:

a reflector having a first and a second focal points;

a source of electromagnetic radiation located proximate to said first focal point to produce rays of radiation that are reflected by said reflector and converge substantially at said second focal point;

said input surface located proximate to said second focal point to collect said electromagnetic radiation.

17. The NA equalizing apparatus of claim 16, wherein said reflector has a coating that reflects only a pre-specified portion of the electromagnetic radiation spectrum.

18. The NA equalizing apparatus of claim 17, wherein said coating only reflects visible light radiation, a pre-specified band of radiation, or a specific color of radiation.

19. The NA equalizing apparatus of claim 16, wherein a portion of the electromagnetic radiation emitted by said source of electromagnetic radiation impinges directly on said reflector and a portion of the electromagnetic radiation does not impinge directly on said reflector and wherein said system further comprises an additional reflector constructed and arranged to reflect at least part of the portion of the electromagnetic radiation that does not impinge directly on said reflector toward said reflector through the first focal point of said reflector to increase the flux intensity of the converging rays.

20. The NA equalizing apparatus of claim 19, wherein said additional reflector comprises a spherical retro-reflector disposed on a side of said source opposite said reflector to reflect electromagnetic radiation emitted from said source in a direction away from said reflector toward said reflector through the first focal point of said reflector.

21. The NA equalizing apparatus of claim 16, wherein said reflector comprises at least a portion of a substantially ellipsoid surface of revolution.

22. The NA equalizing apparatus of claim 16, wherein said reflector comprises at least a portion of a substantially toroidal surface of revolution.

23. The NA equalizing apparatus of claim 16, wherein said reflector comprises at least a portion of a substantially spheroidal surface of revolution.

24. The NA equalizing apparatus of claim 16, wherein said reflector comprises:

a first reflector having a first optical axis, said first focal point being a focal point of said first reflector, said first focal point being on said first optical axis;

a second reflector having a second optical axis, said second focal point being a focal point of said second reflector, said second focal point being on said second optical axis; and wherein said second reflector is disposed substantially symmetrically to said first reflector such that said first optical axis is collinear with said second optical axis.

25. The NA equalizing apparatus of claim 24, wherein said first and second reflectors comprise at least a portion of a substantially paraboloid surface of revolution.

26. The NA equalizing apparatus of claim 24, wherein said first reflector comprises at least a portion of a substantially hyperboloid surface of revolution and said second reflector comprises at least a portion of a substantially ellipsoid surface of revolution.

27. The NA equalizing apparatus of claim 24, wherein said first reflector comprises at least a portion of a substantially ellipsoid surface of revolution and said second reflector comprises at least a portion of a substantially hyperboloid surface of revolution.

28. The NA equalizing apparatus of claim 24, wherein said first and second reflectors comprise at least a portion of a substantially ellipsoid surface of revolution.

29. The NA equalizing apparatus of claim 16, wherein said source comprises a light-emitting arc lamp.

30. The NA equalizing apparatus of claim 29, wherein said arc lamp comprises a lamp selected from the group comprising a xenon lamp, a metal halide lamp, an HID lamp, or a mercury lamp.

31. The NA equalizing apparatus of claim 29, wherein said source comprises a filament lamp.

32. The NA equalizing apparatus of claim 1, comprising further a waveguide disposed proximate to said transmission element to collect said electromagnetic radiation, wherein said waveguide is selected from the group consisting of:
   a single core optic fiber,
   a fiber bundle,
   a fused fiber bundle,
   a polygonal rod,
   a hollow reflective light pipe, and
   a homogenizer.

33. The NA equalizing apparatus of claim 32, wherein a cross-section of said waveguide is selected from the group consisting of:
   a circular waveguide,
   a polygonal waveguide,
   a tapered waveguide, and
   a combination thereof.

34. The NA equalizing apparatus of claim 32, wherein said waveguide comprises a material selected from the group consisting of quartz, glass, plastic, or acrylic.

35. The NA equalizing apparatus of claim 1, comprising further a fiber optic, the fiber optic being illuminated by radiation collected at said transmission element, the fiber optic releasing the collected radiation to provide for illumination at a desired location.

36. The NA equalizing apparatus of claim 1, further comprising:
   a condenser lens disposed proximate to said transmission element;
   an image projection system disposed proximate to an output side of said condenser lens;
   an image being illuminated by radiation collected and condensed at said optical coupling element, the projection system releasing the collected and condensed radiation to display the image.

37. The NA equalizing apparatus of claim 1, wherein said NA equalizing element comprises further:
   an axis;
   an output surface, said output surface comprising:
   a first output dimension and a second output dimension, said second output dimension being substantially orthogonal to said first output dimension, said second output dimension being substantially parallel to said second input dimension; and
   a first input NA in a plane of said first input dimension and said axis;
   a second input NA in a plane of said second input dimension and said axis;
   wherein a first ratio of a first product of said first input dimension and said first input NA to said first output dimension is substantially equal to a second ratio of a second product of said second input dimension and said second input NA to said second output dimension.

* * * * *